United States Patent [19]

Stamer et al.

[11] Patent Number: 4,908,972
[45] Date of Patent: Mar. 20, 1990

[54] EQUIPMENT FOR THE MECHANIZED HANDLING OF LONG LINES

[75] Inventors: Hartwig Stamer, Rostock-Warnemuende; Otto Gabriel, Rostock; Hans-Juergen Kuhlmann, Rostock-Warnemuende; Uwe Oldenburg, Rostock, all of German Democratic Rep.

[73] Assignee: Institut fuer Hochseefischerei und Fischverarbeitung, Marienehe, German Democratic Rep.

[21] Appl. No.: 264,124

[22] Filed: Oct. 28, 1988

[30] Foreign Application Priority Data

Jun. 22, 1988 [DD] German Democratic Rep. .............................. 3169932
Jun. 22, 1988 [DD] German Democratic Rep. .............................. 3169940
Jun. 22, 1988 [DD] German Democratic Rep. .............................. 3169957
Jun. 22, 1988 [DD] German Democratic Rep. .............................. 3169965

[51] Int. Cl.⁴ ............................................. A01K 97/00
[52] U.S. Cl. .......................................... 43/4; 43/27.4; 43/6.5
[58] Field of Search ................... 43/4, 4.5, 6.5, 27.4

[56] References Cited

U.S. PATENT DOCUMENTS

| | | | |
|---|---|---|---|
| 4,132,025 | 1/1979 | Tison | 43/4 |
| 4,354,323 | 10/1982 | Huff | 43/4 |
| 4,453,330 | 6/1984 | Jorgensen-Dahl | 43/27.4 |
| 4,461,112 | 7/1984 | Jacobsen | 43/4 |
| 4,505,062 | 3/1985 | Cook, Jr. | 43/6.5 |
| 4,525,947 | 7/1985 | Furlong | 43/27.4 |
| 4,630,388 | 12/1986 | Furlong | 43/27.4 |
| 4,774,782 | 10/1988 | Jacobsson et al. | 43/4.5 |

Primary Examiner—Kurt Rowan
Attorney, Agent, or Firm—Jordan & Hamburg

[57] ABSTRACT

A system for the mechanized handling of long lines uses a hook-collection tube scarfed at the intake and a long line storage winch with an auxiliary turn-around roller. The individual functional elements are mounted on the frame of the long line storage winch which serves as a line-hauling and storage member to provide functional cooperation of the individual functional elements.

3 Claims, 7 Drawing Sheets

EQUIPMENT FOR THE MECHANIZED HANDLING OF LONG LINES

FIELD OF APPLICATION OF THE INVENTION

The invention relates a system for the mechanized handling of a long line wherein a long line, upon being hauled in, is mechanically stored in such a way that the retrieval process may likewise proceed mechanically. Except for tuna long lines, the storage principle of the invention is suitable for all types of long lines of conventional design, regardless of dissimilar elastic properties of the main line and leaders, for highly variable leader spacings and for leader lengths which, within a tolerance, are within a freely selectable average.

BACKGROUND OF THE INVENTION

Numerous arrangement are known for the partially mechanized processes of hauling in and untwisting leaders, straightening out and separating hooks and storing hooks and lines.

Existing arrangements, with respect to partially or fully mechanized storage technologies, may be divided into three groups according to their basic storage type:
  (1) Horizontal bars, arranged sufficiently high, in which the hooks are lined up in order with freely dangling leader. The main line remaining on the leaders forms loops shoved together fanwise, which like wise dangle freely.
  (2) Hook storage rod that cooperate with a receptacle, in which the main line and the leaders associated with it are coiled spirally.
  (3) Line storage drums
  (a) combined with hook magazines, where the complete longline is wound up on the drum;
  (b) with separate hook storage magazines, where hooks and/or leaders are mechanically coupled before the main line is wound up.

The main elements of the technical equipment utilizing basic storage types (1) and (2) include a hook-separating device with an added hook escape bar on which the hooks slide to the storage bar, and a long line hauler. The latter pulls the hooks through the hook separator onto the escape bar. The main line falls loose behind the hauler. Transport of the hooks from the escape bar onto the storage bars is generally effected by hand. Release upon dropping takes place spontaneously when pull is exerted on the main line.

A typical embodiment of the line hauler used in the arrangement is the wedge roller hauler of U.S. Pat. No. 4,315,617. The Autoline System of Mustad & Son A.S., 2801 Giovik, Norway is representative of a complete system using storage type (1).

A principal disadvantage of the storage principle of type (1) is that only flexurally limp braided line material may be used as the main line and possibly as the leader as well. Devices using storage type (1) are unsuitable for monofilament chemical fibers which have a bending elasticity and with which better catch results can often be obtained because of qualitatively different visual properties and little olfactory contamination as compared with braided material. Devices that use storage type (2) permit the use of flexurally elastic line material. This storage process, however, requires constant manual intervention. A successful system of this type, for example, is the BeGe system is Arbconstruction AB, Karlskrona, Sweden.

Devices which work independently of the properties of elasticity of the line material use storage type (3). A mechanized variant of the last type (3b) is based on the separation of hook and leader. The Miniline System of Mustad of Norway is representative of this type. The essential element of this system is a connecting member (U.S. Pat. 4,149,336), which is accessible to the grasp of a separating and coupling mechanism. The uncoupled leaders with hooks fall into storage containers. An essential disadvantage of this device is that the uncoupled leaders must be arranged in storage magazines by hand to prepare for the mechanized process of dropping the line. The same disadvantage is likewise found in a device in which a mechanically detachable and assemblable hook-shank coupling is used (Norwegian Patent No. 146,935). Here the main line and leader are stored on a vertical drum. The uncoupled hooks have to be placed in the magazine by hand. This principle has undergone a technical change by the Norwegian firm of Bjorshal International, Kristiansund, with the "Turboline" system.

A device using storage type (3a) employs a mechanically driven winch drum, one of whose flanges is formed by radial rods which are simultaneously used to store hooks. The main line with the leaders remaining thereon is stored on the winch drum (GB Pat. No. 1,459,473). This principle was put into practical use in the "Tyliner" system of the U.S. Marco firm of Seattle. The chief disadvantage of this storage method is that the hook-storage process is effected manually. When a leader approaches the storage drum, it is grasped by hand, pulled in the direction of pull of the main line and the hook slipped onto a radial rod located in a suitable position. When reeling off slowly, the hooks automatically slide from the storage rods. When reeling off rapidly in conjunction with mechanical baiting, the risk exists that the hooks will fly from the storage rods in uncontrolled fashion, thus presenting a further disadvantage.

Another device in conjunction with storage type (3a) is represented by a refinement of the abovementioned patent GB 1,459,473 in the direction of fully mechanized storages. This is disclosed in GB Pat. No. 2,120,061 which, in addition to the aforementioned winch with radially arranged hook storages discloses the use of a device through which the hook is mechanically guided to the site of collection, the periphery of the hook-storage flange. This device contains a turn-around roller and a guide device with spring mechanism which brings the hooks to the place where they are picked off, i.e., to the storage flange. How the hooks are moved on to the radial storage rods and, in addition, how they are supposed to be seated secured against centrifugal force in the storages, is not explained therein. Matters relating to orderly winding of the particular line systems are likewise basically not explained.

It is clear from the above methods hitherto adopted for the mechanized storage of monofilament long lines that no fully mechanized solutions yet exist.

In addition to the abovementioned arrangements relating to hauling in and storing lines, patents and arrangements likewise exist concerning processes for untwisting leaders and straightening out hooks.

For untwisting leaders, a vibrator by which the main line is set into high-frequency vibration is disclosed in SU patent No. 1,106,461. Another untwisting method, described in GB Pat. No. 2,124,863, uses rakes, acting in comblike fashion, through which the main line is drawn. A common method consists in that the long line is turned around vertically and in this position is drawn through a system of hard jets of water whose direction of blast is opposed to the direction of pull of the long line.

It is common to all untwisting methods mentioned that straightening proceeds from the hook end of the leader. Especially in the relatively most proven method by means of water jets, a great deal of energy is continuously consumed at low efficiency. For straightening out hooks, SU Pat. No. 1,106,661 uses a device which lays the hooks in a plane and, depending upon the left-hand or right-hand position of the spike, the hooks are guided to separate bars. The resultant alternating position of the hooks fails to make this principle accessible to all given hook storage concepts.

A hook-straightening tube, through which the whole longline is drawn, whose intake end is scarfed and provided with a slotted orifice, and whose diameter is smaller than the hook opening, is commonly used. GB Pat. Nos. 2,106,369 and 2,124,863 refer to this with different proposals for improvement. The chief disadvantage of this principle is that, with hook shapes which differ from a given standard type and often have better fishability, entanglements with the main line are produced.

The currently existing numerous theoretical detailed accomplishments have led to many mechanized long line systems effective in practice in special applications as indicated in the examples mentioned above. For a variety of operating conditions, thus including inshore fishing on smaller vessels, no conclusive fully mechanized accomplishment that is likewise capable of handling monofilament longlines has hitherto been disclosed.

OBJECT OF THE INVENTION

It is an object of the invention to avoid the disadvantages present in known, particularly monofilament, long line-handling systems, such as considerable expenditure of time manually in hauling in and letting outlines manually, malfunctions in winding the main line and leaders on a drum, catching of hooks in the main line during straightening out and separation of hooks, and displacements of hooks on storage bars.

SUMMARY OF THE INVENTION

The invention provides a system for the mechanized handling of a long line wherein the functional elements for hauling in the line, for straightening out and separating hooks, for untwisting leaders and for storing and letting out the line and hooks are combined into a fully mechanized unit for seasonal inshore longline fishing on small fishing vessels, where lines of disimilar rigidity, hence including monofilament long lines, may be handled.

Pursuant to the invention, this object is attained by providing a known long line storage winch with an auxiliary turnaround roller serve as a line-retrieval and storage member on which the complete long line is stored and on whose frame the aforementioned functional elements are mounted. The assembly concept embodies a gearlike meshing of individual processes.

The device for clearing the fishhooks includes a known hook-collection tube, which is provided with a scarfed intake orifice and longitudinal slots and is supplemented by a hook-separating device. Pursuant to the invention, the latter consists of a lifting pendulum with a spring-suspended hook-capturing finger, having an initial position for hook capture and an end position for hook release. The escape bar adjoins the latter position.

Another device, which simultaneously provides hook alignment and hook separation, is comprised of a hook-collection tube of known type, which, instead of a simple longitudinal slot, has a slot that winds spirally 360 degrees about the tube.

In the device for the mechanized hauling, storage and release of a long line using the aforementioned storage winch with turn-around roller, the winch is driven mechanically and the flanges of the storage winch are arranged storage slots, extending radially, provided with hook-restraining lips and tangent to a hook-storage mechanism.

In addition to the known turn-around roller, the hook storage mechanism consists of the escape bar with restraining lips for the sliding fishhooks, a retaining finger adjacent thereto, slotted storage intakes on the storage flange and a spring tension device arranged on the turn-around roller.

The wind-up device consists of a generally known cross-threaded spindle drive on which, pursuant to the invention, is provided a vertically revolving guide arm with a spirally shaped retaining fork arranged at the end, which may in addition be supplemented by a guide roller and simultaneously be a retaining clamp for the guide arm and loop snagger for loose leader bights. The wind-up device is supplemented by a deflecting guard surrounding the turn-around roller.

The elements of the leader-untwisting device pursuant to the invention are a spring rocker arm by means of which an angular momentum is generated, a mechanically releasable stop lever for the spring rocker arm and a gear incorporated in the flange of the drum for restoring the spring rocker arm after completion of untwisting. The untwisting principle presumes the use of a known cardanic rotating and swiveling leader fastening.

BRIEF FIGURE DESCRIPTION

The invention will now be explained in detail with the aid of drawings, wherein

FIG. 1 shows the principle of hook storage in accordance with the invention

FIG. 2 also shows the principle of hook storage in accordance with the invention FIG. 3 shows the line-storage principle FIG. 4 illustrates the hook storage secured against centrifugal force FIG. 5 illustrates the case of damage in hook separation FIG. 6 illustrates a hook-separation device FIG. 7 illustrates a storage winch (side view)

DETAILED DISCLOSURE OF THE INVENTION

Figure 1:
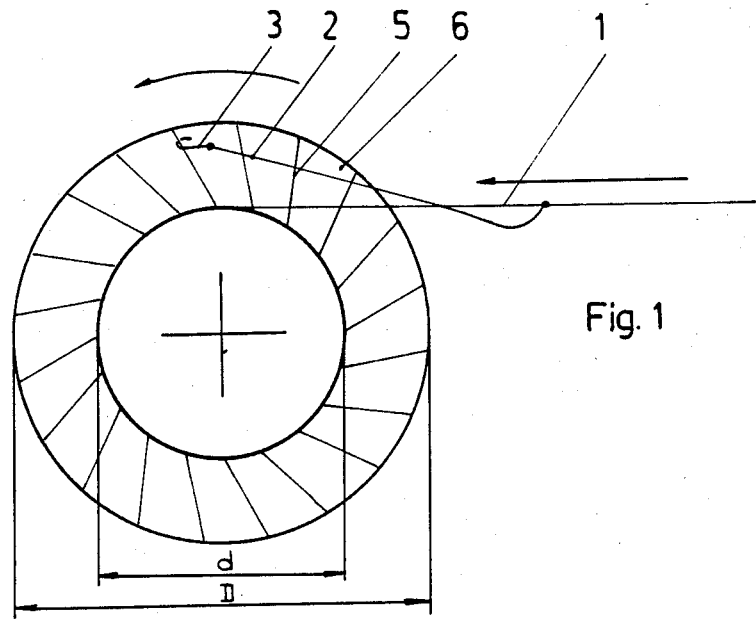
Figure 2:
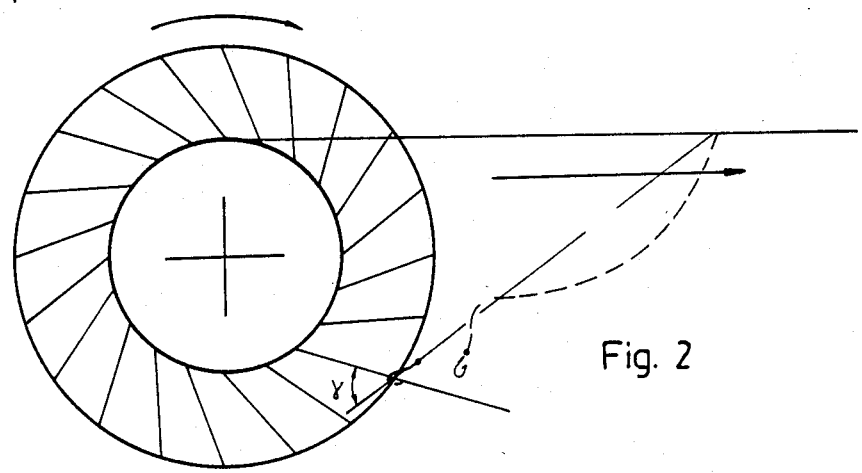
Figure 3:
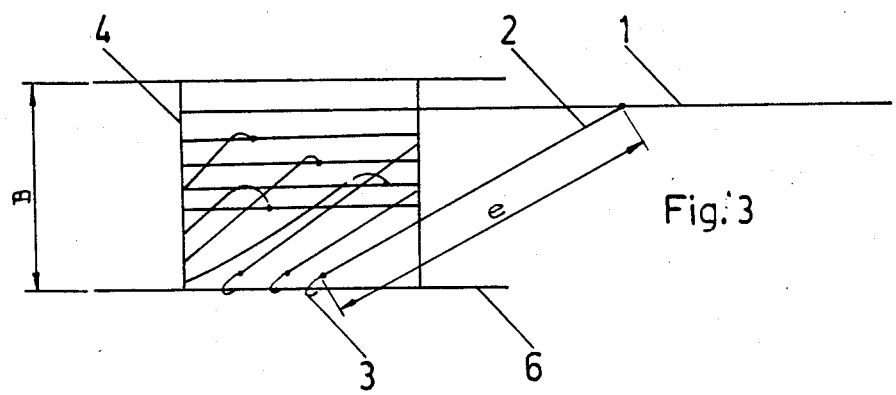
Figure 4:
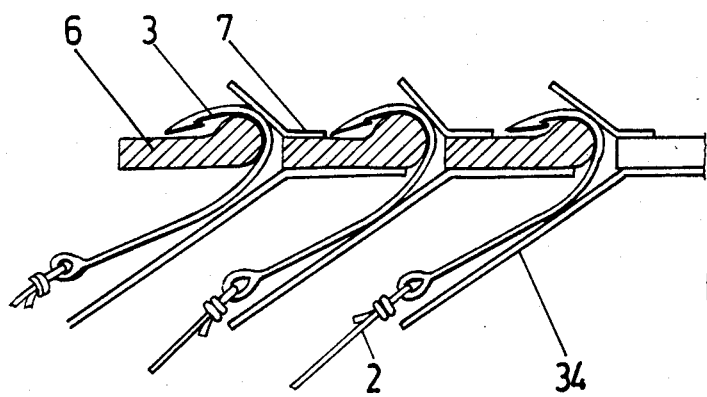

The storage principle of a long line with fishhooks 3 on the winch drum 4 of dimensions D, d and B is illustrated in FIGS. 1–3, wherein the fishhooks 3 are stored in a flange 6 provided with storage slots 5, while main line 1 and leader 2 are accommodated on the drum winch 4. The hooks 3 are each fed into that storage slot 5 whose intake has reached the upper periphery of the flange. There the free leader end points into the wind-up device of the main line 1. To meet the prerequisite that tension is to be transferred only from the main line 1, storage of the hooks 3 must always proceed so that the leader 2 has some slack. Storage in this fashion and the maintenance of fixed geometric relations between the winch dimensions D, d, B, the length 1 of the leader 2 and the friction factor $\mu$ of the hook 3 in the storage slot 5 ensures that upon dropping of the longline (FIG. 2), i.e., reversal of the direction of rotation of the drum, all fishhooks 3 are automatically released before a critical angle $\alpha$ (D,d,l,$\mu$) is reached (FIG. 2). The hooks are fixed in their position in the storage slots by deflectors 34 resting against the shank of the hook and by contact lips 7 consisting of elastic material. Storage is effected in high density, i.e., the hooks are superposed in fan-shaped manner (FIG. 4). Because of the high centrifugal forces acting on the hooks 3, especially when the line is dropped, they are secured against spontaneous slipping into the storage slots 5 by the elastic contact lips 7.

Figure 5:
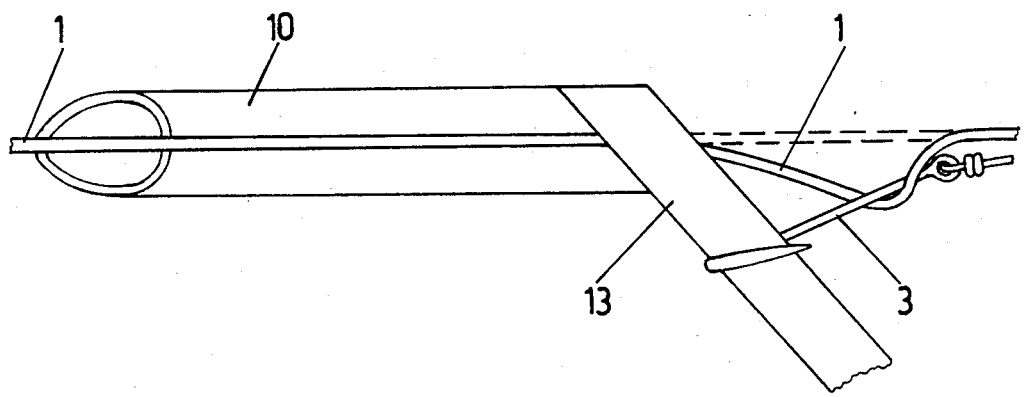
Figure 6:
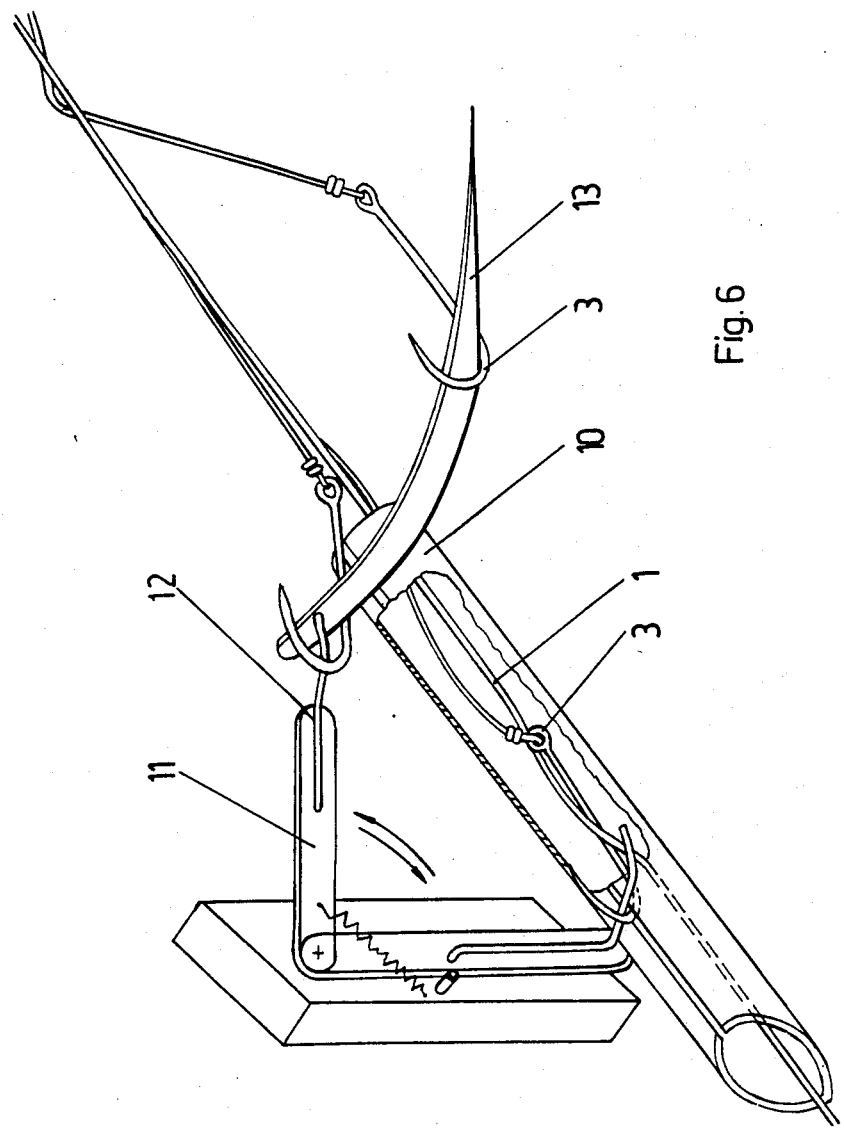
Figure 10:
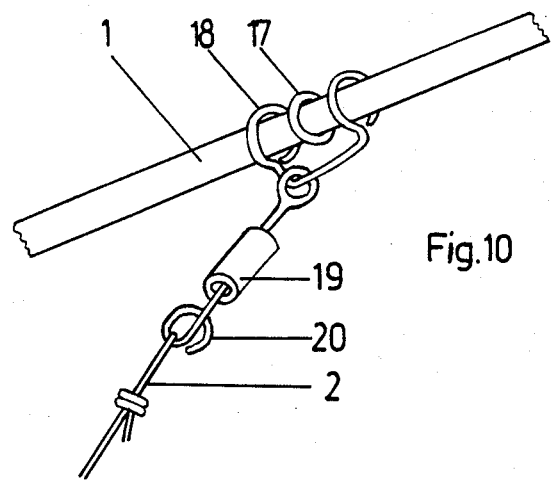
FIG. 10 illustrates the leader fastening
Figure 11:
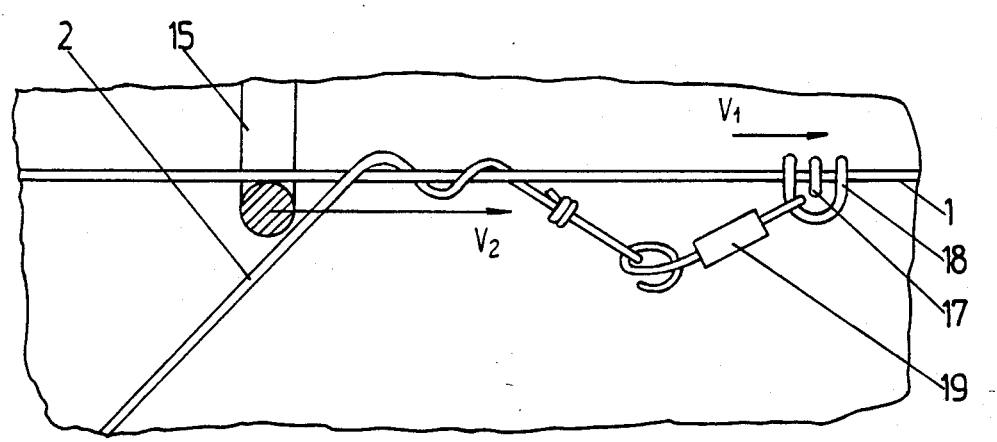
FIG. 11 illustrates the principle of untwisting

The main line 1 with leader 2 must be wound up in orderly fashion according to FIG. 3, and the slack of the leaders 2 must be placed in separate loops insofar as possible. The storage conditions thus predetermined are met by a variety of active mechanical mechanisms, which are structured and coupled with one another as follows (FIGS. 7 and 8):

The main line 1 is hauled in over the hydraulically driven storage winch. After cleaning of the hooks and lines, which will not be described further here, and the replacement of defective leaders 2 and hooks 3 by means of an eyelet 18, the main line 1 travels over the hook-separating device, whose location is eccentric to and in front of the winch drum. The separating device consists of a funnel 8 with a spring-suspended deflector plate 9 and a generally known hook-collection tube 10. Here the fishhooks are collected, straightened out and guided onto the escape bar 13 in definite position, while all other elements of the longline reach the drum. Depending upon the shape of the hook, jamming of the hooks 3 in the main line 1 may then occur relatively frequently (FIG. 5), as a result of which the hook pulls the main line along onto the escape bar 13 and thus causes damage. To prevent this, the fishhook 3 is captured during its transit through the hook-collection tube 10 by a spring-suspended lever pendulum 11 with capturing finger 12 (FIG. 6), lifted at the bend of the hook and rotated about the eye of the hook. The hook 3 then breaks out of its jam and slides from the spring-suspended capturing finger 12, the end of which points to the escape bar 13, over to the latter. From there it is able to slide freely to the hook storage location, which lies in the plane of the storage flange 6 and at the level of the upper periphery thereof. First, however, the escaping end of the leader 2, moving away from the main line 1, first releases the stop level 14 for the spring rocker arm 15 for untwisting. The latter, propelled by the rocker lever spring 16, springs into the bifurcation extending between the main line 1 and the leader 2 (FIG. 11) and in the event of twisting releases an angular momentum in relation to the leader fastening consisting of stopper muff 17, swivel member 18 and collar 19 with eyelet 20 (FIG. 10), so that untwisting is effected.

In the end position, the rocker arm 15 touches the displaceable turn-around roller 21, provided with a groove, and prevents the leader 2 from moving into the latter, keeping it spread up to the fastening.

Figure 7:
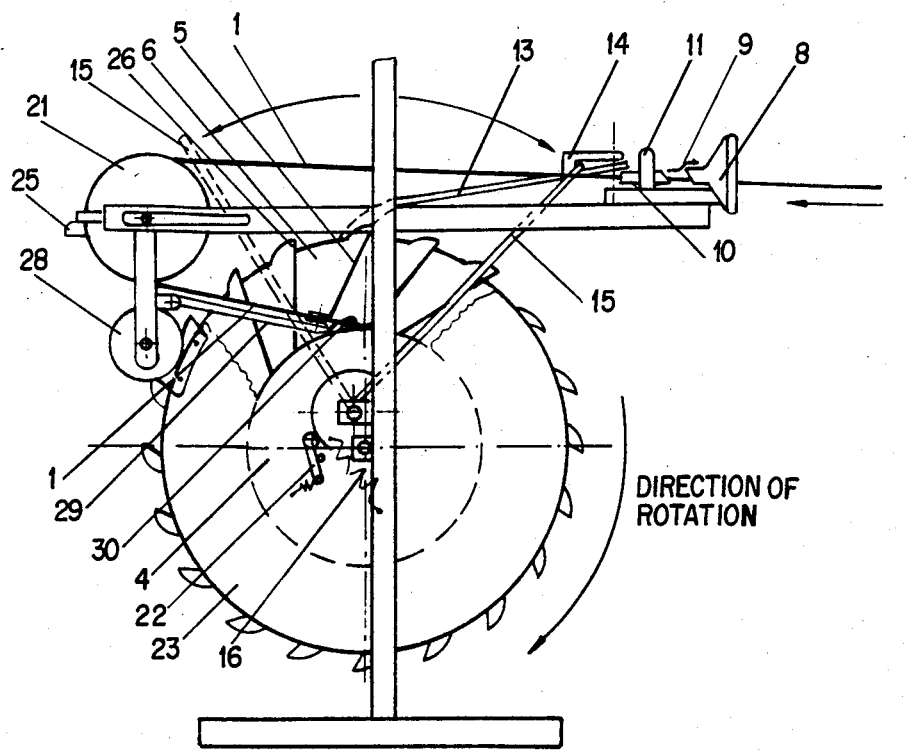
Figure 8:
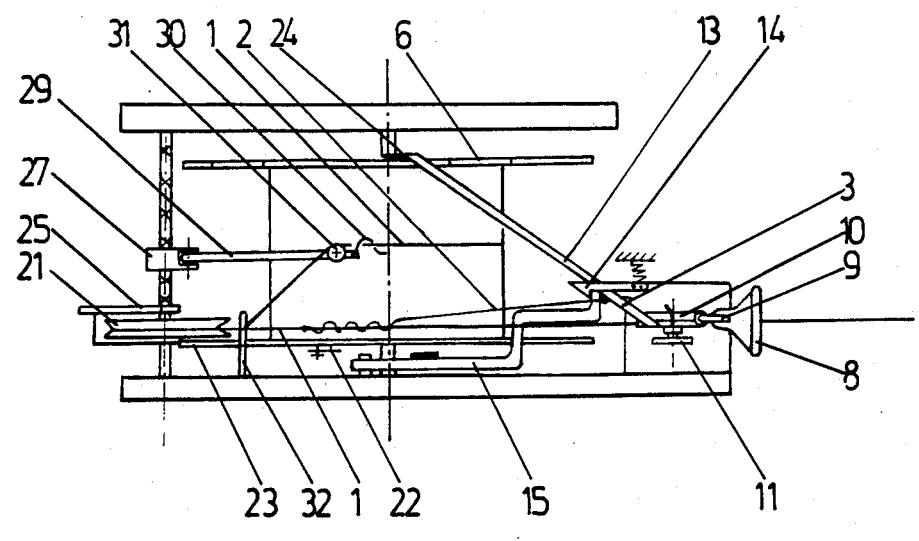
FIG. 8 illustrates a storage winch (top view)

Renewed tension of the rocker arm 15 is obtained by means of a trip cam 22 attached to the drum flange 23 (FIGS. 7 and 8). As a rule, this cam is disengaged. It engages briefly only at the location of the end position of the rocker arm 15 and enables the rocker arm 15 to grasp and carry it along until the latter again engages in the stop lever. Then the cam 22 disengages.

Figure 9:
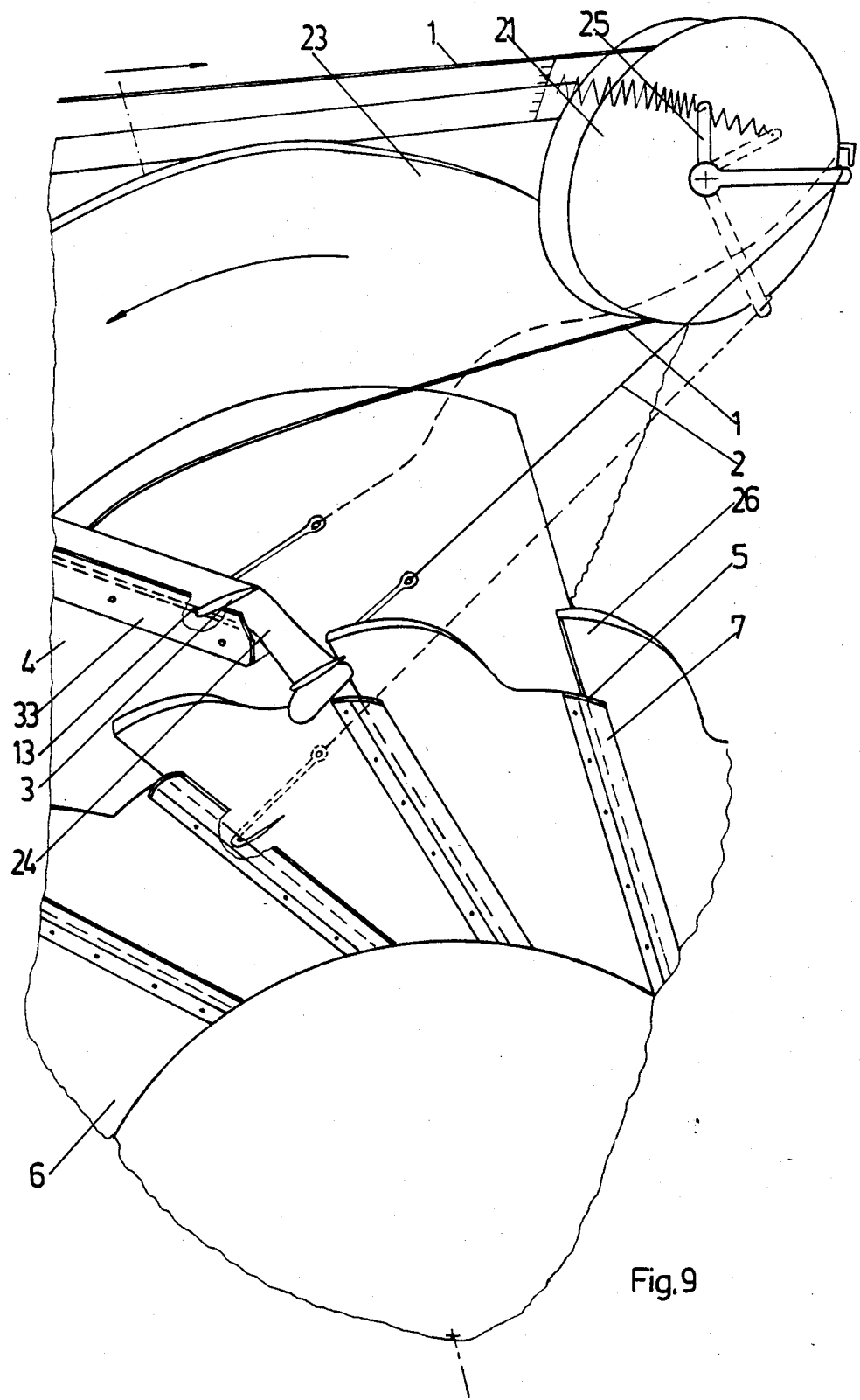
FIG. 9 illustrates a hook-storing mechanism

The hook 3 slides further into the vicinity of the end of the bar (FIG. 9), which runs spirally and becomes the hook-retaining finger 24. On the latter is found the pick-off location of the fishhooks 3. The hooks 3, held fast by the restraining lip 33 (FIG. 9), remain just in front of this pick-off location, since the displaceable turn-around roller 21 is positioned so that there is still slack in the leader 2 when the leader fastening passes the dead center of turn-around. Upon continued travel of the leader fastening through the turn-around roller 21, the leader catches as a loop on the storage arm 25, which rests against the turn-around roller 21 and the end of which projects over the periphery of the roller at the dead center of turn-around (FIG. 9). Since tension increasingly comes into the loop of the leader 2, the hook 3 slides to the pick-off location on the hook-retaining finger 24 and is grasped by the next hook grab 26 passing by and pulled into the adjacent storage slot 5 (FIG. 9). The storage slot 5 is provided with a restraining lip 7 consisting of elastic film (FIGS. 4 and 9), through the stored hooks are seated, secured against centrifugal force.

Figure 12:
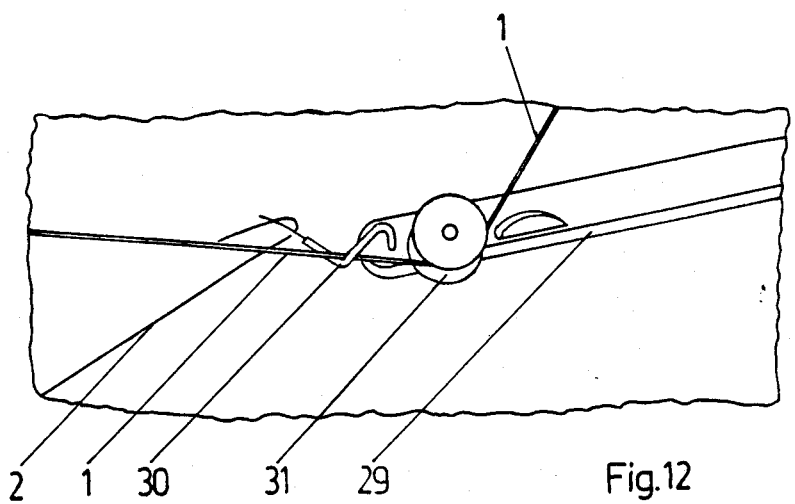
FIG. 12 illustrates a wind-up device

The friction work expended by the hooks sliding into the storage slot 5 is captured by the work that the spring storage arm 25 performs during its movement in a rotary path (FIG. 9). If the hook has reached the bottom of the storage slot 5, the loop of the leader slides freely from the spring storage arm 25. To promote sliding motions, the hook grab 26 and the hook-storage slots 5 are inclined in a tangential direction, deviating from the radial direction. Orderly wind-up of the main line 1 and leader 2 on the drum 4 is effected by a guide device. The basic component thereof is a generally known cross-threaded spindle device 27, which is moved by a friction gear 28 (FIGS. 7 and 8). The kinematics on which the line system to be wound up is based are determined in that the leader, after storage of the hooks, follows a path of motion differing from the motion of the main line. The latter requires that, in wind-up, the turn-around point must lie directly in the vicinity of the wind-up point, i.e., of the point of contact of the main line 1 with the members of the drum 4. To this end, there is attached to the cross-threaded spindle device a vertically rotating guide arm 29 (FIGS. 7 and 8), which ends in a spirally shaped retaining fork 30 with guide roller 31 (FIGS. 7, 8 and 12). While the guide roller 31 serves as turn-around element, the spirally shaped fork 30 has the function of suspending the guide arm 29 form-lockingly on the main line 1 stretched between turnaround roller 21 and wind-up point. The retaining fork 30 terminates in an elastic rod element, through which the loose bights of the leaders are laid in loops and drawn under the wound-up main line 1. The guide device is supplemented by a deflecting guard 32 mounted on the turn-around roller 21. This guard prevents the main line from being pulled out of the roller 21. To ensure a uniform motion of the storage slots 5, certain relations, which are advantageously predetermined by means of a computer program simulating the storage process, must be maintained between leader spacing and drum diameter.

We claim:

1. In a system for the mechanized handling of long lines and including a hook collection tube with a scarfed intake and a long line storage winch with an auxiliary turn around roller for receiving the long line from the hook collection tube, the winch having a mechanically driven drum; the improvement comprising:
- a pivoted lifting pendulum mounted adjacent the hook collection tube and having a hook capturing finger, said lifting pendulum being movable between a hook capture position and a hook release position;
- said winch drum having a storage flange with storage slots for storing hooks, said slots extending in a direction inclined to the radial direction of said flange and having restraining lips and deflectors;
- an escape bar having a restraining lip and an adjoining hook retaining finger, said escape bar being positioned at the hook release position of said capturing finger;
- grab hook means for grabbing said hooks and pulling them into said storage slots;
- a spring arm on said turn around roller for catching leaders on said long line;
- a cross threaded spindle device mounted adjacent to said winch drum, and a vertically rotating guide arm on said cross threaded spindle device, the guide having a spirally shaped retaining fork and a guide roller thereon for guiding said long line from said turn around roller to said winch drum;
- trip cam means on said flange, a spring rocker arm mounted to be actuated by said trip cam means for moving along said long line to untwist leaders thereon from the main line; and
- a mechanically releasable stop lever for said rocker arm, said stop lever being positioned to be released by the bifurcation between said leader and said main line.

2. The system for the mechanized handling of long lines of claim 1 wherein a leader of said long line is coupled to said long line by a cardanic rotating and pivoting connection, said connection comprising a swivel member on said long line, collar means coupling said swivel member to said leader, and an eyelet on said long line for inhibiting longitudinal movement of said swivel member.

3. The system for the mechanized handling of long lines of claim 1 further comprising a deflecting guard on the turn around roller.

* * * * *